(12) United States Patent
Kaneyoshi et al.

(10) Patent No.: US 6,387,339 B1
(45) Date of Patent: May 14, 2002

(54) RARE EARTH OXIDE PARTICLES AND METHOD FOR PREPARATION THEREOF

(75) Inventors: Masami Kaneyoshi; Shigeru Sakai, both of Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/709,424

(22) Filed: Nov. 13, 2000

(30) Foreign Application Priority Data

Nov. 11, 1999 (JP) .......................................... 11-321434

(51) Int. Cl.⁷ ................................................ C01F 17/00
(52) U.S. Cl. ....................................................... 423/263
(58) Field of Search ................................ 423/263, 21.1

(56) References Cited

U.S. PATENT DOCUMENTS

| | | | | |
|---|---|---|---|---|
| 3,635,658 A | * | 1/1972 | Ferri et al. ................. | 423/263 |
| 4,049,789 A | * | 9/1977 | Manabe et al. | |
| 6,210,604 B1 | * | 4/2001 | Hampden-smith et al. | |

FOREIGN PATENT DOCUMENTS

| | | | |
|---|---|---|---|
| JP | 8-059233 | * | 3/1996 |
| JP | 8-059234 | * | 3/1996 |
| JP | 9-235547 | * | 9/1997 |

* cited by examiner

*Primary Examiner*—Steven Bos
(74) *Attorney, Agent, or Firm*—Wenderoth, Lind & Ponack, L.L.P.

(57) ABSTRACT

Disclosed is an improvement in the method for the preparation of a rare earth oxide powder particularly suitable as a base material of luminescence phosphors. The improvement comprises, in a method comprising the steps of mixing aqueous solutions of a rare earth salt and oxalic acid to precipitate the rare earth oxalate, collecting the precipitates by filtration, drying the precipitates and calcining the dried precipitates, conducting the oxalate-precipitating reaction at a temperature at 15° C. or lower and freezing the wet precipitates at −25° C. or lower prior to vacuum drying to give dried particles of the rare earth oxalate containing 20% by weight or less of water including the water of crystallization. The particles of the thus obtained rare earth oxide powder are characterized by the small pore volume and average crystallite diameter.

11 Claims, No Drawings

RARE EARTH OXIDE PARTICLES AND METHOD FOR PREPARATION THEREOF

BACKGROUND OF THE INVENTION

The present invention relates to particles of a rare earth oxide having unique characteristics to be suitable as a base material of rare earth-based phosphors as well as to a method for the preparation of the unique rare earth oxide particles. More particularly, the invention relates to particles of a rare earth oxide characterized by unique granulometric and intragranular parameters as well as to an improvement in the method for the preparation of such rare earth oxide particles.

It is well established that various powders of rare earth oxides are widely employed in the applications as a base material for the preparation of luminescent phosphors used in fluorescent lamps, cathode-ray tubes and the like and as an ingredient in sintered ceramic articles. It is usually accepted that the performance of rare earth oxide particles in these applications can be improved by controlling or optimizing the granulometric characteristics of the particles such as the particle configuration, average particle diameter and the like.

While the most conventional method for the preparation of a rare earth oxide powder is calcination of a rare earth oxalate obtained by mixing aqueous solutions of a water-soluble rare earth salt and oxalic acid to effect a precipitation reaction of the rare earth oxalate, improved methods based on this background technology are disclosed in Japanese Patent Kokai 3-271117 and 3-271118, according to which rare earth oxide particles having a spherical particle configuration can be prepared by conducting the precipitation reaction of the rare earth oxalate at a low temperature. Even though these methods are suitable for giving rare earth oxide particles having a generally spherical particle configuration, electron microscopic examinations of high magnification reveal that the surface of the generally spherical particles are rather rugged and not smooth. Presumably due to this surface condition, the phosphors prepared from these spherical rare earth oxide particles cannot always exhibit high performance as a phosphor such as the intensity of luminescence or fluorescence.

SUMMARY OF THE INVENTION

The present invention accordingly has an object, in view of the above described problems and disadvantages in the conventional rare earth oxide particles as a base material of luminescent phosphors, to provide improved rare earth oxide particles capable of giving luminescent phosphors exhibiting upgraded performance as a phosphor.

Thus, the rare earth oxide particles provided by the present invention, which preferably have a spherical particle configuration, are characterized by a pore volume not exceeding 0.02 ml/g and an average crystallite diameter not exceeding 50 nm.

The invention further provides an improvement, in the method for the preparation of particles of a rare earth oxide comprising the steps of: (1) mixing an aqueous solution of a water-soluble salt of a rare earth element and an aqueous solution of oxalic acid to effect precipitation of a rare earth oxalate in an aqueous medium; (2) separating the precipitates of the rare earth oxalate from the aqueous medium to give dried rare earth oxalate particles; and (3) calcining the dried precipitates of the rare earth oxalate in an oxidizing atmosphere, which improvement comprises:

(a) conducting, in step (1), mixing of the aqueous solutions of a rare earth salt and oxalic acid at a temperature not higher than 15° C.;

(b) conducting, in step (2), filtration of the precipitates and washing of the precipitates with water at a temperature not higher than 15° C.;

(c) freezing the precipitates of the rare earth oxalate after washing with water at a temperature not higher than −25° C.; and (d) drying, prior to the calcination in step (3), the thus frozen precipitates of the rare earth oxalate by vacuum drying until the content of water therein including the wetting water and water of crystallization does not exceed 20% by weight based on the anhydrous rare earth oxalate.

DETAILED DESCRIPTION OF THE PREFERRED EMBODIMENTS

As is described above, the method for the preparation of rare earth oxide particles according to the improvement provided by the present invention is characterized in conducting the precipitation reaction of the rare earth oxalate and washing of the oxalate precipitates with water at a specified low temperature and freezing the rare earth oxalate precipitates after washing with water at a specified low freezing temperature prior to the calcination treatment.

The rare earth element of the rare earth oxide particles which should be prepared by the improved method of the present invention can be selected from the group consisting of yttrium and the elements having an atomic number in the range from 57 to 71 on the Periodic Table. The rare earth oxide optionally contains two kinds or more of these rare earth elements in combination so that the rare earth oxide can be, for example, a europium-doped yttrium oxide or terbium-doped yttrium oxide from which a red-emitting or green-emitting, respectively, phosphor can be prepared. When the intended application of the rare earth oxide particles is as a base material of a phosphor, it is a due selection that at least 80% by moles or, in particular, from 85 to 90% by moles of the rare earth element constituting the rare earth oxide is selected, in consideration of the high optical transparency in the visible region, from the group consisting of yttrium, lanthanum, gadolinium and lutetium or, preferably in consideration of the low hygroscopicity and abundance as a natural resource, yttrium and gadolinium or, in particular, yttrium. The dopant or activator rare earth element to be combined with the rare earth oxide of the above named elements as the host phase is selected from the other rare earth elements depending on the luminescence characteristics of the phosphor includes cerium, samarium, europium, terbium, dysprosium and thulium of which europium and terbium are known as a red-emitting and a green-emitting activator, respectively.

When the intended application of the rare earth oxide particles is as a base material of a sintered ceramic article or as a sintering aid of other ceramic materials, on the other hand, it is preferable that the rare earth component in the rare earth oxide is one or a combination of the elements selected from yttrium and the elements having an atomic number of 64 to 71.

The inventors have conducted extensive investigations on the relationship between the microstructure or, namely, the intragranular structure of rare earth oxide particles and the performance thereof as a base material of luminescent phosphors to arrive at a discovery that rare earth oxide particles having a pore volume of as small as 0.02 ml/g or smaller or, preferably, in the range from 0.003 to 0.01 ml/g well give a high-performance phosphor. The reason therefor is presumably that infiltration of the flux material used in the process of phosphor preparation into the rare earth oxide particles can be suppressed when the pore volume of the particles is small enough. This advantageous effect can further be promoted when the rare earth oxide particles have a spherical particle configuration. The pore volume here implied is a parameter determinable by means of the adsorption characteristics of nitrogen gas on the particles at the temperature of liquid nitrogen, i.e. −196° C.

The small pore volume of the rare earth oxide particles is not the only characterizing parameter which the particles as a base material of phosphors should have. For example, it is known that rare earth oxide particles obtained by a calcination treatment of a rare earth oxalate at an unduly high temperature or those obtained by crushing and pulverizing a solidified melt of the oxide have an extremely small pore volume but are not capable of giving a high-performance phosphor presumably due to poor reactivity of the particles even by the combined use of a flux or even by a combination with other oxides such as aluminum oxide, silicon dioxide and vanadium oxide to give a composite oxide phosphor.

As a result of the further continued investigations, the inventors have arrived at a discovery that the reactivity of the oxide particles is deeply correlated with the average crystallite diameter of the oxide particles as an intragranular parameter. Namely, the rare earth oxide particles as a base material of phosphors should have an average crystallite diameter D not exceeding 50 nm or, preferably, in the range from 20 to 45 nm.

The average crystallite diameter D (nm) of the rare earth oxide particles is a parameter obtained from the peak width in the X-ray diffractometric diagram by calculation with the Scherrer equation $$D=\lambda/(\beta \times \cos \theta),$$

In which $\lambda$ (nm) is the wavelength of the X-rays for diffraction, $\beta$, (radian) is the angular broadening of the diffraction peak and $\theta$ is the diffraction angle of the diffraction peak usually given as 2 $\theta$ on the X-ray diffraction chart.

Although it is a difficult matter to quantitatively define the sphericity of the rare earth oxide particles having a spherical particle configuration, the particles should desirably be in an isolated or discrete form without forming any agglomerates.

The rare earth oxide particles characterized above described unique granulometric and intragranular parameters can be prepared by the method described below which comprises the steps of (1) precipitation of a rare earth oxalate in an aqueous medium, (2) separation of the rare earth oxalate precipitates from the aqueous medium for drying and (3) calcination of the dried rare earth oxalate.

In the first step for the precipitation of a rare earth oxalate in an aqueous medium, an aqueous solution of a water-soluble salt of the rare earth element and an aqueous solution of oxalic acid are mixed together so that a rare earth oxalate is formed and precipitated in the aqueous medium. The mixing order of the two solutions is not particularly limitative but it is usually preferable that the aqueous oxalic acid solution is poured into the aqueous rare earth salt solution under agitation. It is essential in this procedure that the precipitation reaction of the rare earth oxalate proceeds at a temperature not higher than 15° C. so that both of the aqueous solutions under mixing are kept at this low temperature. The temperature should preferably be as low as −5° C. unless troubles are caused by freezing of the aqueous solutions and/or the aqueous precipitation medium.

Several kinds of rare earth salts can be used as the watersoluble salt of the rare earth elements including nitrates, chlorides, sulfates and acetates, of which nitrates are preferred.

The concentration of the rare earth element in the rare earth salt solution is in the range from 0.02 to 1.0 mole/liter. When the concentration is too low, a decrease is caused in the productivity of the process due to handling of an excessively large volume of the solution while, when the concentration is too high, troubles are sometimes encountered due to intermixing of non-spherical particles in the product of the rare earth oxide particles.

The concentration of oxalic acid in the aqueous oxalic acid solution is in the range from 0.01 to 0.5 mole/liter. The reason for the lower limit of the oxalic acid concentration is the same as for the lower limit of the rare earth salt concentration. When the concentration of oxalic acid is too high in the aqueous oxalic acid solution as prepared, it is a possible trouble that a portion of the oxalic acid precipitates out in the solution in the form of crystals by bringing the solution to a temperature not higher than 15° C.

In consideration of the stoichiometry of the oxalate-forming reaction that the molar ratio of the rare earth ions and oxalate ions in a rare earth oxalate is 2:3, the molar proportion of oxalic acid in the aqueous oxalic acid solution and the rare earth salt calculated as the rare earth element in the aqueous solution thereof should be in the range from 1.5 to 2.0. When the molar proportion of oxalic acid is too low, a portion of the rare earth ions remains unprecipitated in the precipitation medium so that the yield of the rare earth oxalate based on the starting rare earth salt is unduly decreased. An increase of the amount of oxalic acid to exceed the above given upper limit has no particular advantages rather with an economical disadvantage due to futile loss of oxalic acid.

The adding order of the two aqueous solutions is not particularly limitative. Namely, the aqueous oxalic acid solution can be added to the aqueous rare earth salt solution or vice versa. It is, however, usually preferable that the oxalic acid solution is added to the rare earth salt solution in respect of the small amount of non-spherical particles in the final product. It is preferable that mixing of the two aqueous solutions is completed within 10 minutes in order to accomplish good uniformity of the particle size distribution in the oxide product.

The temperature of the aqueous solutions as well as the precipitation medium should not exceed 15° C. because formation of irregular particles may eventually be increased when the precipitation reaction is undertaken at a temperature higher than 15° C.

It has been a quite unexpected discovery that a substantial improvement can be obtained in the working conditions of the oxalate precipitation reaction by conducting the reaction in the presence of an organic basic compound under the same requirement for the temperature of the reaction. Namely, an organic basic compound is added, in conducting admixture of the two aqueous solutions to effect precipitation of the rare earth oxalate, to either one of the rare earth solution and the oxalic acid solution or to both. In this case, an advantage is obtained that the concentration of the rare earth element in the aqueous rare earth salt solution can be as high as 2.0 moles/liter to be substantially higher than the upper limit of the rare earth concentration in the absence of an organic basic compound assuming that the concentration of oxalic acid in the oxalic acid solution and the molar ratio of the rare earth salt and oxalic acid are the same as in the absence of an organic basic compound.

Examples of the organic basic compound mentioned above preferably include ethanolamines such as triethanolamine, hexamethylene tetramine and urea in respect of the adequate basicity, safety to human body and workability, of which triethanolamine is more preferable. The amount of the organic basic compound to be added to one or both of the two aqueous solutions should not exceed 2 moles per mole of the rare earth element pertaining to the precipitation reaction of the oxalate. An excessively large amount of the organic basic compound may eventually lead to formation of product particles of irregular particle configurations. As to the admixing order of the two aqueous solutions in the presence of the organic basic compound, it is preferable that the aqueous rare earth salt solution is added under agitation to an aqueous oxalic acid solution admixed with the organic basic compound in respect of the stability of the precipitation process when the intended application of the rare earth oxide particles is as a base material of luminescent phosphors.

The precipitates of the rare earth oxalate obtained in the above described manner are separated from the aqueous precipitation medium, for example, by filtration and washed with water to be freed from any dissolved solutes in the aqueous medium. It is important here that the washing water is kept at a temperature not higher than 15° C. in order not to increase the temperature of the oxalate precipitates.

Prior to drying, it is essential in the inventive method that the wet oxalate precipitates after washing with water are subjected to a freezing treatment at a temperature not higher than –25° C. or, preferably, in the range from –30 to –50° C. and kept in the frozen state for at least 10 minutes. This freezing treatment is important in order to impart the rare earth oxide particles with desirable granulometric and intragranular characteristics suitable for a base material of phosphors.

It is a convenient way that the freezing treatment of the wet oxalate precipitates is conducted in a vacuum freeze-drier further equipped with a heating means in which freezing and drying of the wet oxalate precipitates are performed consecutively under monitoring of the temperature.

When the oxalate precipitates have been fully frozen at the specified temperature, the vacuum freeze-drier is evacuated to have a reduced pressure not exceeding 300 Pa or, preferably, not exceeding 150 Pa to effect vacuum drying of the precipitates. Although the temperature of this vacuum drying is not limited to the freezing temperature, the oxalate precipitates under vacuum-drying should be kept at a temperature not higher than 10° C. or, preferably, not higher than 0° C. so that it is convenient to employ a vacuum drier of which the freezing chamber is provided therein with one or more of shelves having a heating means in order to slightly increase the temperature of the oxalate under drying. Thus, the wet oxalate precipitates are taken in and spread on a metal-made flat tray which is mounted on the shelf followed by freezing of the precipitates and then evacuation of the chamber with heating of the shelf to effect vacuum drying. Care should be taken to keep the temperature of the shelves not to exceed 100° C.

This vacuum drying procedure is continued until the water content of the oxalate precipitates is decreased to 20% by weight or lower or, preferably, to 5 to 18% by weight based on the amount of the anhydrous oxalate after complete drying. If oxalate precipitates in which the residual content of water is too high are subjected as such to the subsequent calcination treatment, undesirable phenomena may take place in the granular characteristics of the oxide particles such as roughening of the particle surfaces. The content of water in the oxalate precipitates here implied includes not only the wetting water but also the water of crystallization when the dried oxalate is a hydrated oxalate with water of crystallization.

The last step of the inventive method is the calcination treatment of the dried oxalate precipitates in an atmosphere of an oxidizing gas such as air so that the rare earth oxalate particles are thermally decomposed and converted into particles of the rare earth oxide. The temperature schedule of this calcination treatment is such that the highest temperature reached is in the range from 700 to 1100° C. or, preferably, from 800 to 950° C. When the calcination temperature is too low, thermal decomposition of the oxalate and conversion thereof into an oxide would be incomplete while, when too high, an undue growth may proceed in the average crystallite diameter if not to mention possible damages on the saggers and the heater elements of the calcination furnace.

In the preparation of a luminescent phosphor using the rare earth oxide particles prepared according to the present invention as the base material, the rare earth oxide as the host of the phosphor should be combined with an activator rare earth oxide as a dopant selected depending on the desired spectral emission characteristics of the phosphor together with known additives such as boric acid, phosphoric acid and the like according to need.

In the following, Examples are given to illustrate the inventive method for the preparation of rare earth oxide particles and characterization thereof in more detail although the scope of the invention is never limited thereby in any way.

EXAMPLE 1

An aqueous solution of yttrium nitrate and europium nitrate in a yttrium:europium molar ratio of 95:5, of which the total concentration of the rare earth elements was 0.2 mole/liter and the pH was 1.3, was prepared and a 1.2 liter portion of the solution was taken in a beaker of 3 liter capacity equipped with baffle plates, a thermometer and a stirrer and kept at a temperature of 5° C. Separately, 1.5 liters of an aqueous oxalic acid solution in a concentration of 0.25 mole/liter were prepared and kept at a temperature of 5° C. This oxalic acid solution as a whole was gradually added to the rare earth nitrate solution under agitation with the stirrer rotated at 400 rpm taking about 5 minutes to precipitate a mixed rare earth oxalate. After 5 minutes of further continued agitation, the oxalate precipitates were collected by filtration through a Buchner funnel and the cake on the funnel was washed by sprinkling 1.5 liters of cold water kept at a temperature of 8° C.

After ceasing of water dripping, the cake was rapidly transferred onto a surface-anodized aluminum tray and uniformly spread thereon to form a layer of about 1 cm thickness and the tray was put into the drying chamber of a freeze-drier having shelves capable of being chilled and heated. The refrigerating machine was brought into operation to decrease the temperature of the shelves under monitoring of the temperature of the wet cake by means of a thermometer inserted into the layer of the cake until the temperature of the cake had reached –33° C.

By keeping the cold trap directly connected to the drying chamber at –40° C., running of the refrigerating machine was terminated and the chamber was evacuated by running a vacuum pump down to a pressure of 15 Pa. The temperature of the cake under drying was gradually increased to reach –25° C. after 2 hours and –2° C. after 8 hours. Thereafter, the temperature of the shelves was gradually increased to reach 50° C. after 4 hours and the shelves were kept at this temperature with a consequent increase of the temperature of the cake up to 23° C. After 12 hours as a total of continued evacuation, heating of the shelves and running of the vacuum pump were terminated and the drying chamber was released to the atmospheric air to take out the dried oxalate which was found to contain 10.5% by weight of water as a total of the wetting water and water of crystallization by the analysis of a small portion of the dried oxalate.

The thus obtained dried rare earth oxalate was transferred to a fused silica glass tray as a sagger and subjected to a calcination treatment in an electric furnace under. atmospheric air to follow such a temperature profile that the temperature was increased up to 900° C. taking 2 hours and kept at this temperature for 1 hour followed by spontaneous cooling under a stream of air.

As examined with an electron microscope, the thus obtained europium-doped yttrium oxide consisted of discretely dispersible spherical particles.

EXAMPLE 2

A 2 liter volume of an aqueous oxalic acid solution in a concentration of 0.4 mole/liter, which also contained 60 g of triethanolamine, was prepared in a beaker of 3 liter capacity equipped with baffle plates, a thermometer and a stirrer and kept at a temperature of 5° C. Separately, a 500 ml volume of an aqueous solution of mixed rare earth nitrates of yttrium nitrate and terbium nitrate in a molar ratio of 95:5, of which the total rare earth concentration was 1.0 mole/liter and the pH was 1.2,was prepared followed by further admixture of 10 g of triethanolamine and kept at 5° C. This rare earth nitrate solution was gradually added taking 5 minutes to the oxalic acid solution kept at 5° C. under agitation with the stirrer rotating at 400 rpm followed by further continued agitation for 5 minutes to effect precipitation of mixed rarer earth oxalates.

The oxalate precipitates were collected by filtration through a Buchner funnel and the cake on the funnel was washed by sprinkling 3 liters of cold water kept at a temperature of 8° C.

The thus obtained wet cake of precipitates of the mixed rare earth oxalate was processed in substantially the same manner as in Example 1 into particles of terbium-doped yttrium oxide. The dried oxalate taken out of the vacuum drying chamber contained 11.4% by weight of water.

As examined with an electron microscope, the thus obtained terbium-doped yttrium oxide consisted of discretely dispersible spherical particles.

COMPARATIVE EXAMPLE 1

The procedure was substantially the same as in Example 1 down to the step of collection of the precipitates of oxalate by filtration through a Buchner funnel. The wet cake on the Buchner funnel was dehydrated by washing with 3 liters of methyl alcohol at 7° C. followed by evaporation of the methyl alcohol at room temperature in an air-circulation drying machine taking 24 hours. The thus dried oxalate contained 24.5% by weight of water as a total of the wetting water and water of crystallization.

The calcination treatment of the thus dried rare earth oxalate was undertaken in substantially the same manner as in Example 1 to obtain particles of a europium-doped yttrium oxide.

As examined with an electron microscope, this rare earth oxide was found to consist of discretely dispersible, generally spherical particles but the surfaces of the particles appeared to be somewhat rugged as compared with the particles obtained in Example 1 or Example 2.

COMPARATIVE EXAMPLE 2

The procedure to obtain particles of a europium-doped yttrium oxide was substantially the same as in Comparative Example 1 except that the temperature profile of the calcination treatment of the dried oxalate consisted of a stage of temperature elevation up to 1150° C. taking 150 minutes and a stage of temperature holding at this temperature for 1 hour followed by spontaneous cooling.

As examined with an electron microscope, this rare earth oxide was found to consist of discretely dispersible, generally spherical particles but the surfaces of the oxide particles appeared to be somewhat rugged as compared with the particles obtained in Example 1 or Example 2.

COMPARATIVE EXAMPLE 3

The procedure was substantially the same as in Example 2 down to the step of collection of the precipitates of oxalate by filtration through a Buchner funnel. The wet cake on the Buchner funnel was dehydrated by washing with 3 liters of methyl alcohol at 7° C. followed by evaporation of the methyl alcohol at room temperature in an air-circulation drying oven taking 24 hours. The thus dried oxalate contained 23.6% by weight of water as a total of the wetting water and water of crystallization.

The calcination treatment of the thus dried rare earth oxalate was undertaken in substantially the same manner as in Example 1 to obtain particles of a terbium-doped yttrium oxide.

As examined with an electron microscope, this rare earth oxide was found to consist of discretely dispersible, generally spherical particles but the surfaces of the oxide particles appeared to be somewhat rugged as compared with the particles obtained in Example 1 or Example 2.

COMPARATIVE EXAMPLE 4

The procedure to obtain particles of a terbium-doped yttrium oxide was substantially the same as in Comparative Example 3 except that the temperature profile of the calcination treatment of the dried oxalate consisted of a stage of temperature elevation up to 1150° C. taking 150 minutes and a stage of temperature holding at this temperature for 1 hour followed by spontaneous cooling.

As examined with an electron microscope, this rare earth oxide was found to consist of discretely dispersible, generally spherical particles but the surfaces of the oxide particles appeared to be somewhat rugged as compared with the particles obtained in Example 1 or

EXAMPLE 2

Characterization of the europium- or terbium-doped yttrium oxide particles obtained in the Examples 1 and 2 and Comparative Examples 1 to 4 as well as evaluation thereof as a base material of a phosphor were conducted in the following manner.
(1) Pore Volume of the Oxide Particles:
Calculated was made from the volume of nitrogen gas adsorption on the particles at −196° C.
(2) Average Crystallite Diameter:
Calculation was made from the peak width in the powder X-ray diffractometric diagram of the particles.
(3) Relative Luminescence Intensity of Phosphor Derived from Europium-doped Yttrium Oxide A 20 g portion of the europium-doped yttriumoxide particles obtained in Example 1,Comparative Example 1 or Comparative Example 2 was blended by using a mortar and pestle with 0.2 g of barium chloride dihydrate $BaCl_2 \cdot 2H_2O$ and 20 mg of boric acid $H_3BO_3$ and the blend was taken in an alumina crucible and calcined in air at 1350° C. for 5 hours with the covering of the crucible slightly displaced to leave a gas escape. The calcined material was scraped out of the crucible and, after gentle disintegration in a mortar, subjected to a wetprocess grinding treatment in a ball mill containing alumina balls of about 5 mm diameter followed by drying to give a fine powder as a red-emitting phosphor.

The thus prepared phosphor powder was subjected to a fluorescence measurement at a wavelength of 611 nm using a fluorescence spectrophotometer (Model F-4000, manufactured by Hitachi Ltd.) by excitation with ultraviolet light of 254 nm wavelength. The fluorescence intensity of the red fluorescence from the samples obtained in the Comparative Examples was recorded by the relative value taking the intensity in Example 1 as 100.

(4) Relative Luminescence Intensity of Phosphor Derived from Terbium-doped Yttrium Oxide A 10 g portion of the terbium-doped yttriumoxide particles obtained in Example 2, Comparative Example 3 or Comparative Example 4 was blended by using a mortar and pestle with 7.4 g of aluminum oxide and 0.4 g of barium fluoride and the blend was taken in an alumina crucible and calcined at 1350° C. for 5 hours in an atmosphere of a 1:99 by volume mixture of hydrogen and nitrogen with the covering of the crucible slightly displaced to leave a gas escape. The calcined material was scraped out of the crucible and, after gentle disintegration in a mortar, subjected to a wet-process grinding treatment in a ball mill containing alumina balls of about 5 mm diameter followed by drying to give a fine powder as a green-emitting phosphor.

The thus prepared phosphor powder was subjected to a fluorescence measurement at a wavelength of 545 nm using the same fluorescence spectrophotometer as used above by excitation with ultraviolet light of 365 nm wavelength. The fluorescence intensity of the green fluorescence from the samples obtained in the Comparative Examples was recorded by the relative value taking the intensity in Example 2 as 100.

The results of these characterization and evaluation tests are shown in Table 1 below.

TABLE 1

| | Pore volume, ml/g | Average crystallite diameter, nm | Relative intensity of fluorescence | |
|---|---|---|---|---|
| Example 1 | 0.0054 | 36 | 100 | Excitation: |
| Comparative Example 1 | 0.0452 | 45 | 94 | 254 nm Fluorescence: |
| Comparative Example 2 | 0.0113 | 92 | 92 | 611 nm |
| Example 2 | 0.0064 | 34 | 100 | Excitation: |
| Comparative Example 3 | 0.0517 | 47 | 93 | 365 nm Fluorescence: |
| Comparative Example 4 | 0.0097 | 95 | 79 | 545 nm |

What is claimed is:

1. A method for the preparation of particles of a rare earth oxide, comprising the steps of:
   mixing an aqueous solution of a water-soluble salt of a rare earth element and an aqueous solution of oxalic acid at a temperature not higher than 15° C. to form precipitates of a rare earth oxalate in an aqueous medium;
   filtering and washing the precipitates of the rare earth oxalate with water at a temperature not higher than 15° C. to form wet precipitates;
   freezing the wet precipitates of the rare earth oxalate at a temperature not higher than −25° C. to form frozen precipitates;
   drying the frozen precipitates of the rare earth oxalate by vacuum drying to an extent that the content of water therein including the washing water and water of crystallization does not exceed 20% by weight relative to an anhydrous form of the rare earth oxalate, to form dried precipitates; and
   calcining the dried precipitates of the rare earth oxalate in an oxidizing atmosphere, to form particles of the rare earth oxide.

2. The method of claim 1, in which mixing of the aqueous solutions of the rare earth salt and oxalic acid is conducted in the presence of an organic basic compound.

3. The method of claim 2, in which the organic basic compound is selected from the group consisting of ethanolamine compounds, hexamethylene tetramine and urea.

4. The method of claim 3, in which the organic basic compound is triethanolamine.

5. The method of claim 2, in which the amount of the organic basic compound used is 2 moles or less per mole of the rare earth element in the rare earth salt.

6. The method of claim 2, in which the organic basic compound is added to the aqueous solution of oxalic acid, and then the aqueous solution of oxalic acid containing the organic basic compound is added to the aqueous solution of the rare earth salt.

7. The method of claim 2, in which mixing of the aqueous solutions of the rare earth salt and oxalic acid is completed within 10 minutes.

8. The method of claim 1, in which the freezing of the wet precipitates of the rare earth oxalate is conducted at a temperature in a range of from −30 to −50° C.

9. The method of claim 1, in which the precipitates of the rare earth oxalate after vacuum drying contains from 5 to 18% by weight of water relative to an anhydrous form of the rare earth oxalate.

10. The method of claim 1, in which the rare earth salt is a rare earth nitrate.

11. The method of claim 1, in which the rare earth oxalate is kept in a frozen state for at least 10 minutes.

* * * * *